(12) United States Patent
Tanaka et al.

(10) Patent No.: US 8,603,674 B2
(45) Date of Patent: Dec. 10, 2013

(54) COMPOSITION FOR ELECTRODE OF NONAQUEOUS ELECTROLYTE SECONDARY BATTERY, ELECTRODE FOR NONAQUEOUS ELECTROLYTE SECONDARY BATTERY USING THE SAME AND NONAQUEOUS ELECTROLYTE SECONDARY BATTERY

(75) Inventors: Tadayoshi Tanaka, Takatsuki (JP); Hiroshi Minami, Kobe (JP); Naoki Imachi, Kobe (JP); Kazunari Yasumura, Osaka (JP); Kunihiro Iwai, Osaka (JP); Daisuke Imai, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 462 days.

(21) Appl. No.: 12/977,993

(22) Filed: Dec. 23, 2010

(65) Prior Publication Data

US 2011/0159363 A1    Jun. 30, 2011

(30) Foreign Application Priority Data

Dec. 24, 2009   (JP) ................................ 2009-292778

(51) Int. Cl.
*H01M 4/62*    (2006.01)

(52) U.S. Cl.
USPC .................... 429/217; 429/218.1; 429/231.8; 429/233

(58) Field of Classification Search
USPC .......................... 429/217, 218, 1, 231.8, 233
See application file for complete search history.

(56) References Cited

U.S. PATENT DOCUMENTS

2010/0248035 A1*   9/2010   Minami et al. ........... 429/231.95

FOREIGN PATENT DOCUMENTS

| JP | 9-213306 A | 8/1997 |
|---|---|---|
| JP | 10-106542 A | 4/1998 |
| JP | 2002-175807 A | 6/2002 |

* cited by examiner

*Primary Examiner* — Laura Weiner
(74) *Attorney, Agent, or Firm* — Westermann, Hattori, Daniels & Adrian, LLP

(57) ABSTRACT

A composition for an electrode of a nonaqueous electrolyte secondary battery contains an active material and a binder resin. The composition contains a vinylpyrrolidone-based polymer as the binder resin. The hydroxyl group equivalent of the vinylpyrrolidone-based polymer is within the range of 250 to 2500.

16 Claims, 2 Drawing Sheets

COMPOSITION FOR ELECTRODE OF NONAQUEOUS ELECTROLYTE SECONDARY BATTERY, ELECTRODE FOR NONAQUEOUS ELECTROLYTE SECONDARY BATTERY USING THE SAME AND NONAQUEOUS ELECTROLYTE SECONDARY BATTERY

BACKGROUND OF THE INVENTION

1. Field of the Invention

This invention relates to compositions for electrodes of nonaqueous electrolyte secondary batteries, electrodes for nonaqueous electrolyte secondary batteries using the same and nonaqueous electrolyte secondary batteries.

2. Description of Related Arts

In recent years, size and weight reduction of mobile information terminals including cellular phones, notebook computers and personal data assistants (PDAs) has rapidly progressed. Along with this, there has been an increasing demand to increase the capacity of batteries used as their driving power sources. In addition, the use of nonaqueous electrolyte secondary batteries has been expanded to applications requiring high power, such as hybrid electric vehicles (HEVs) and electric tools. Thus, the development of nonaqueous electrolyte secondary batteries is being polarized into two directions, i.e., the direction to increase capacity and the direction to increase power.

For the purpose of increasing the battery capacity, high-capacity positive electrode materials to replace lithium cobaltate and high-capacity negative electrode materials to replace graphite have been developed. However, positive and negative electrodes using lithium cobaltate and graphite, respectively, which are mainstream materials for current lithium secondary batteries, have excellent performance balance, and the operations of a wide variety of mobile devices have been designed to adapt to the characteristics of batteries using these materials. Therefore, at present, the development of high-capacity electrode materials to replace lithium cobaltate and graphite has not progressed so far. Particularly, a change in the type of negative electrode material causes a significant change in the charge-discharge curve of the battery and in turn a significant change in the battery operating voltage. For this reason, the replacement of graphite with other high-capacity negative electrode materials is difficult to advance under present circumstances.

Nevertheless, power consumption of mobile devices is increasing year by year, and there has been a strong demand to increase the capacity of batteries. Therefore, at present, in order to respond to the demand to increase the battery capacity, substantially no choice exists but to increase the packing density of the negative electrode using graphite or increase the thickness of the negative electrode mixture layer.

Meanwhile, for example, from the standpoint of reduction in environmental burden in producing nonaqueous electrolyte secondary batteries, there has been recently proposed a technique in which an aqueous slurry is used to produce a negative electrode. Known aqueous slurries used to produce negative electrodes include those using a latex-based binder, such as styrene-butadiene rubber (SBR). However, aqueous slurries using a latex-based binder are difficult to coat in a thick film. Therefore, as disclosed in, for example, Published Japanese Patent Application No. 2002-175807, a thickener, such as carboxymethyl cellulose (CMC), is generally added to such an aqueous slurry using a latex-based binder.

Aqueous slurries using CMC and a latex-based binder have excellent coatability, and the use of such an aqueous slurry facilitates the coating of a thick film. Therefore, a thick mixture layer can be formed in a single coating pass.

However, with the use of an aqueous slurry using CMC and a latex-based binder, there are attendant difficulties in achieving high adhesion strength between the current collector and the mixture layer.

In the present invention, as described hereinafter, a vinylpyrrolidone-based polymer is used as a binder resin. On the other hand, in Published Japanese Patent Application No. H10-106542, polyvinylpyrrolidone (PVP) is used as a thickener, and a slurry containing polyvinylpyrrolidone and montmorillonite mixed thereinto is used to produce an electrode. In Published Japanese Patent Application No. H09-213306, a mixture of polyvinyl acetate and PVP is used as a binder resin. However, these patent literatures do not disclose at all particular vinylpyrrolidone-based polymers as described in the present invention and operations and effects caused by using the same.

SUMMARY OF THE INVENTION

A composition for an electrode according to the present invention is a composition for an electrode of a nonaqueous electrolyte secondary battery, the composition containing an active material and a binder resin, wherein the binder resin includes a vinylpyrrolidone-based polymer. The hydroxyl group equivalent of the vinylpyrrolidone-based polymer is within the range of 250 to 2500.

The composition for an electrode contains as a binder resin a vinylpyrrolidone-based polymer (hereinafter also referred to as a "hydroxyl group-containing PVP") of which the hydroxyl group equivalent is 250 to 2500. The use of a vinylpyrrolidone-based polymer as a binder resin improves the adhesion between the composition for an electrode of a nonaqueous electrolyte secondary battery and the electrode. In addition, the introduction of hydroxyl groups within the above range into the polymer offers the electrode a high degree of flexibility. The more preferred range of the hydroxyl group equivalent is 250 to 800. If the hydroxyl group equivalent is too low, the pyrrolidone equivalent is relatively high, whereby the adhesion tends to be lowered. On the other hand, if the hydroxyl group equivalent is too high, the electrode tends to become hardened.

In the present invention, the hydroxyl group equivalent means the molecular weight per hydroxyl group in the polymer and can be calculated according to the following equation:

$$\text{Hydroxyl group equivalent} = \{Hf \times (100/Hw)\}/Hn$$

where Hf represents the molecular weight of monomer giving hydroxyl groups in the polymer, Hn represents the number of hydroxyl groups contained in the monomer, and Hw represents the initial weight percentage (%) of the monomer serving as a source of hydroxyl groups in the polymer.

Specific examples of the method for introducing hydroxyl groups into the vinylpyrrolidone-based polymer include (i) the method of copolymerizing vinylpyrrolidone and a hydroxyl group-containing monomer, and (ii) the method of copolymerizing vinylpyrrolidone and a monomer capable of producing hydroxyl groups and then producing hydroxyl groups in the polymer. The methods (i) and (ii) can be employed alone or in combination.

The hydroxyl group-containing monomer used in the method (i) may be any compound whose molecules contain a polymerizable unsaturated group copolymerizable with vinylpyrrolidone and one or more hydroxyl groups. Specific examples of such a hydroxyl group-containing monomer include hydroxyl group-containing (meth)acrylates, hydroxyl group-containing (meth)acrylamides and α-hydroxymethyl acrylate. The particularly preferred compounds are 2-hydroxyethyl acrylate, 2-hydroxyethyl methacrylate, glycerol monoacrylate, glycerol monomethacrylate, diethylene glycol monoacrylate, diethylene glycol monomethacrylate, polyethylene glycol monoacrylate, polyethylene glycol monomethacrylate, methyl 2-hydroxymethyl acrylate and ethyl 2-hydroxymethyl acrylate.

The monomer capable of producing hydroxyl groups in the method (ii) may be any compound whose molecules contain a polymerizable unsaturated group copolymerizable with vinylpyrrolidone and a substituent capable of producing one or more hydroxyl groups. Specific examples of such a monomer include epoxy group-containing monomers, oxetane group-containing monomers and vinyl ester compounds. The particularly preferred compounds are vinyl acetate, epoxybutene, glycidyl acrylate and glycidyl methacrylate. With the use of the monomer capable of producing hydroxyl groups, hydroxyl groups can be easily produced by hydrolyzing the obtained polymer or adding water to the obtained polymer.

A generally applicable and preferred method of copolymerizing vinylpyrrolidone and a hydroxyl group-containing monomer and/or a monomer capable of producing hydroxyl groups is solution polymerization, and the particularly preferred method is dropping polymerization. The implementation of solution polymerization enables efficient introduction of a hydroxyl group-containing monomer and/or a monomer capable of producing hydroxyl groups into the polymer, thereby reducing the amount of polymer formed so that vinylpyrrolidone, the hydroxyl group-containing monomer or the monomer capable of producing hydroxyl groups is singly polymerized.

The pyrrolidone equivalent of the vinylpyrrolidone-based polymer is preferably within the range of 112 to 170. The more preferred range of the pyrrolidone equivalent is 120 to 160. If the pyrrolidone equivalent is too low, the hydroxyl group equivalent is relatively high. Thus, the electrode tends to become hardened. On the other hand, if the pyrrolidone equivalent is too high, the adhesion tends to be lowered.

In the present invention, the pyrrolidone equivalent means the molecular weight per pyrrolidone ring in the polymer and can be calculated according to the following equation:

$$\text{Pyrrolidone equivalent} = \{Pf \times (100/Pw)\}/Pn$$

where Pf represents the molecular weight of monomer serving as a source of pyrrolidone in the polymer, Pn represents the number of pyrrolidone rings contained in the monomer, and Pw represents the initial mass percentage (%) of the monomer serving as a source of pyrrolidone in the polymer.

The hydroxyl group equivalent and the pyrrolidone equivalent can also be calculated from actual measured values obtained using well-known measurement techniques including NMR and titration.

Furthermore, the polymer may be any vinylpyrrolidone-based polymer obtained by copolymerizing copolymerizable monomers other than vinylpyrrolidone, hydroxyl group-containing monomers and monomers capable of producing hydroxyl groups.

In addition to the vinylpyrrolidone-based polymer, the binder resin preferably further includes a modified cellulose and more preferably still further includes a latex-based binder. A specific example of the modified cellulose is carboxymethyl cellulose. Specific examples of the latex-based binder include styrene-butadiene rubber (SBR), acrylonitrile-butadiene rubber, acrylic ester-based latexes, vinyl acetate-based latexes, methyl methacrylate-butadiene-based latexes and their carboxyl-modified products. Among these latex-based binders, SBR having high Li-ion conductivity is preferably used as the latex-based binder.

Since the binder resin further includes carboxymethyl cellulose and a latex-based binder, the coatability of a slurry for forming the active material layer can be improved and the hardness of the electrode can be reduced.

The content of the hydroxyl group-containing PVP in the active material layer is preferably within the range of 0.05% to 2.00% by mass, and more preferably within the range of 0.05% to 0.80% by mass. If the content of the hydroxyl group-containing PVP is too low, the strength may be low. On the other hand, if the content of the hydroxyl group-containing PVP is too high, ion migration may be prevented.

The content of carboxymethyl cellulose (CMC) is preferably selected, from the standpoints of increase in adhesion between the current collector and the active material layer and increase in capacity, so that the weight ratio of hydroxyl group-containing PVP to CMC in the active material layer (hydroxyl group-containing PVP/CNC) is more than 0/10 and not more than 4/6. If the ratio of hydroxyl group-containing PVP is low, the adhesion strength between the current collector and the active material layer may not be able to be sufficiently increased. The use of CMC provides high adhesion strength between the current collector and the active material layer and enables increase in stability of dispersion of the active material in the active material layer.

If the content of CMC is not more than the content of hydroxyl group-containing PVP, the coatability of a slurry for forming the active material layer is lowered and the slurry may be difficult to coat in a thick film.

The content of the active material is preferably within the range of 96% to 99% by mass. The active material used may be a positive-electrode active material or a negative-electrode active material. Therefore, the composition for an electrode may be one for forming a positive-electrode active material layer or one for forming a negative-electrode active material layer. Recently, aqueous slurries have been often used to produce negative electrodes. Therefore, the composition for an electrode according to the present invention is particularly preferably used for the production of a negative electrode.

An electrode for a nonaqueous electrolyte secondary battery according to the present invention is characterized in that an active material layer formed using the above composition for an electrode according to the present invention is provided on a current collector.

Since the electrode for a nonaqueous electrolyte secondary battery according to the present invention includes an active material layer formed using the above composition for an electrode, the electrode has high adhesion strength between the current collector and the active material layer and excellent flexibility. Therefore, even in forming an electrode assembly by winding or bending the electrode, the electrode can be changed in form without flake-off of the active material layer.

The current collector that can be used is any current collector commonly used as a negative electrode current collector, such as copper foil. On the other hand, if the current collector is used for a positive electrode, it may be any current collector commonly used as a positive electrode current collector, such as aluminum foil.

The negative-electrode active material that can be used is not particularly limited so long as it can be used as a negative-electrode active material for a nonaqueous electrolyte secondary battery. Examples of the negative-electrode active material include carbon materials, such as graphite and coke, metal oxides, such as tin oxide, metals that can form an alloy with lithium to store lithium, such as silicon and tin, and metal lithium. The negative-electrode active materials particularly preferably used in the present invention are carbon materials, such as graphite.

The positive-electrode active material that can be used is not particularly limited so long as it can be used as a positive-electrode active material for a nonaqueous electrolyte secondary battery. Examples of the positive-electrode active material include layered compounds including lithium cobaltate and other lithium-transition metal composite oxides, such as lithium-cobalt-nickel-manganese composite oxide.

A nonaqueous electrolyte secondary battery according to the present invention is characterized by including the above electrode according to the present invention and a nonaqueous electrolyte. As described above, the electrode according to the present invention may be used as a negative electrode or as a positive electrode.

Since the nonaqueous electrolyte secondary battery according to the present invention uses the electrode according to the present invention as a negative electrode or a positive electrode, the electrode has high adhesion strength between the current collector and the active material layer and excellent flexibility. Therefore, a nonaqueous electrolyte secondary battery can be provided which has a high charge/discharge capacity and excellent stability.

The solvent for the nonaqueous electrolyte used is not particularly limited, but an example of the solvent is a mixture solvent of a cyclic carbonate, such as ethylene carbonate, propylene carbonate or butylene carbonate, and a chain carbonate, such as dimethyl carbonate, methyl ethyl carbonate or diethyl carbonate. Another example of the solvent is a mixture solvent of the above cyclic carbonate and an ether solvent, such as 1,2-dimethoxyethane or 1,2-diethoxyethane. Examples of the solute for the nonaqueous electrolyte include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_5O_2)_3$, $LiC(C_2F_5SO_2)_3$, $LiAsF_6$, $LiClO_4$, $Li2B_{10}Cl_{10}$, $Li_2B_{12}Cl_{12}$ and their mixtures. The solutes particularly preferably used are mixture solutes of $LiXF_y$ (where X represents P, As, Sb, B, Bi, Al, Ga or In, y is 6 if X is P, As or Sb and y is 4 if X is Bi, Al, Ga or In) and lithium perfluoroalkylsulfonic acid imide $LiN(C_mF_{2m+1}SO_2)(C_nF_{2n+1}SO_2)$ (where m and n are independently integers from 1 to 4) or lithium perfluoroalkylsulfonic acid methide $LiN(C_pF_{2p+1}SO_2)(C_qF_{2q+1}SO_2)(C_rF_{2r+1}SO_2)$ (where p, q and r are independently integers from 1 to 4). Among these, the particularly preferred is a mixture solute of $LiPF_6$ and $LiN(C_2F_5SO_2)_2$. Examples of the electrolyte include gel polymer electrolytes in which a polymer electrolyte, such as polyethylene oxide or polyacrylonitrile, is impregnated with an electrolytic solution, and inorganic solid electrolytes, such as LiI and $Li_3N$. The materials that can be used as the solute and solvent for the electrolyte are not limited so long as a lithium compound serving as a solute for exhibiting ion conductivity and the solvent for dissolving and holding the solute are not decomposed by a voltage during charge and discharge of the battery or during storage.

The nonaqueous electrolyte secondary battery according to the present invention can be produced using the above-described positive electrode, negative electrode and nonaqueous electrolyte. A separator is generally disposed between the positive and negative electrodes. In this state, the separator and the positive and negative electrodes are placed into an outer package and the nonaqueous electrolyte is then poured into the outer package, thereby producing a nonaqueous electrolyte secondary battery.

DETAILED DESCRIPTION

Figure 1:
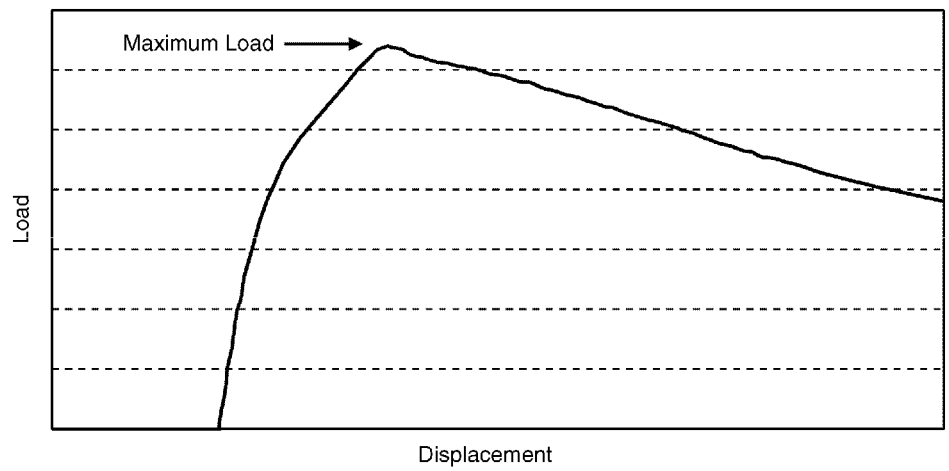
FIG. 1 is a graph showing the relation between load applied to an electrode piece and displacement of the piece.

Hereinafter, the present invention will be described in more detail. However, the present invention is not limited at all by the following examples and can be embodied in various other forms appropriately modified without changing the spirit of the invention.

EXAMPLES 1 TO 7 AND COMPARATIVE EXAMPLES 1 TO 4

First, a negative electrode was produced in the following manner.

[Production of Negative Electrode]

A 1.0% by mass aqueous solution of CMC (Grade 1380 manufactured by Daicel Chemical Industries, Ltd.) was added to artificial graphite (average particle size: 21 μm, surface area: 4.0 m$^2$/g) to reach an active material concentration of 60% by mass and kneaded at 90 rpm for 60 minutes using a kneader ("HIVIS MIX®" manufactured by PRIMIX Corporation). Thereafter, a 1.0% by mass CMC aqueous solution was further added to the mixture to give an artificial graphite to CMC mass ratio of 98:0.8 and kneaded at 90 rpm for 20 minutes. Next, a 1.0% by mass aqueous solution of vinylpyrrolidone-based polymer was added to the mixture so that the solids composition, by mass ratio, would be artificial graphite/CMC/vinylpyrrolidone-based polymer=98:0.8:0.2, and kneaded at 90 rpm for 20 minutes. Then, SBR (solid content concentration: 50% by mass) was added to the mixture in the kneader so that the solids composition, by mass ratio, would be artificial graphite/(CMC+vinylpyrrolidone-based polymer)/SBR=98:1:1, and mixed at 40 rpm for 45 minutes. Next, deionized water was further added to the mixture to give a slurry viscosity of 1.0 Pa·s (at 25° C.), thereby producing a slurry for forming a negative-electrode active material layer.

Next, the obtained slurry was coated on both sides of each of pieces of copper foil to reach a target amount of coating of 226 mg per 10 cm$^2$, then dried and rolled to reach a packing density of 1.60 g/cm$^3$, thereby obtaining a negative electrode.

Example 1

To produce the above vinylpyrrolidone-based polymer, 282 g of ultrapure water, 121 g of isopropyl alcohol (IPA) and 8 g of N-vinylpyrrolidone (NVP) were added as initial feeds to a SUS 304-made polymerization vessel provided with a condenser, a nitrogen introduction line and a thermometer, and nitrogen was introduced into the vessel while the mixture was stirred until the dissolved oxygen in the mixture solution reached 0.2 ppm or below. The mixture solution was raised in temperature to reach 80° C. inside the vessel, followed by dropwise addition over 123 minutes of a monomer solution in which 160 g of NVP, 62 g of glycerol monomethacrylate ("BLEMMER® GLM" manufactured by NOF Corporation), 0.36 g of triethanolamine (TEA) and 97 g of ultrapure water were mixed and an initiator solution in which 3.6 g of dimethyl-2,2'-azobis(isobutyrate) (V601 manufactured by Wako Pure Chemical Industries, Ltd.) was dissolved in 31 g of IPA.

Subsequently, a monomer solution in which 10 g of glycerol monomethacrylate, 5 g of ultrapure water and 14 g of IPA were mixed was added to the vessel over 60 minutes. Thereafter, the mixture solution was raised in temperature and distilled for 90 minutes, thereby obtaining a clear, colorless polymer solution.

Using the vinylpyrrolidone-based polymer obtained in the above manner, a negative electrode was produced according to the manner described in the above "Production of Negative Electrode" so that the solids composition of a final negative electrode slurry, by mass ratio, would be artificial graphite/CMC/vinylpyrrolidone-based polymer/SBR=98:0.8:0.2:1.0. The obtained negative electrode is referred to as Example 1.

Note that the addition of triethanolamine to the monomer solution is aimed at controlling the pH of the monomer solution.

Example 2

To produce the above vinylpyrrolidone-based polymer, 282 g of ultrapure water, 121 g of isopropyl alcohol (IPA) and 8 g of NVP were added as initial feeds to a SUS 304-made polymerization vessel provided with a condenser, a nitrogen introduction line and a thermometer, and nitrogen was introduced into the vessel while the mixture was stirred until the dissolved oxygen in the mixture solution reached 0.2 ppm or below. The mixture solution was raised in temperature to reach 80° C. inside the vessel, followed by dropwise addition over 123 minutes of a monomer solution in which 148 g of NVP, 72 g of 2-hydroxyethyl acrylate (HEA), 0.36 g of triethanolamine (TEA) and 97 g of ultrapure water were mixed and an initiator solution in which 3.6 g of dimethyl-2,2'-azobis(isobutyrate) (V601 manufactured by Wako Pure Chemical Industries, Ltd.) was dissolved in 31 g of IPA.

Subsequently, a monomer solution in which 12 g of HEA, 5 g of ultrapure water and 14 g of IPA were mixed was added to the vessel over 60 minutes. Thereafter, the mixture solution was raised in temperature and distilled for 90 minutes, thereby obtaining a clear, colorless polymer solution.

Using the vinylpyrrolidone-based polymer obtained in the above manner, a negative electrode was produced according to the manner described in the above "Production of Negative Electrode" so that the solids composition of a final negative electrode slurry, by mass ratio, would be artificial graphite/CMC/vinylpyrrolidone-based polymer/SBR=98:0.8:0.2:1.0. The obtained negative electrode is referred to as Example 2.

Example 3

To produce the above vinylpyrrolidone-based polymer, 282 g of ultrapure water, 121 g of isopropyl alcohol (IPA) and 8 g of NVP were added as initial feeds to a SUS 304-made polymerization vessel provided with a condenser, a nitrogen introduction line and a thermometer, and nitrogen was introduced into the vessel while the mixture was stirred until the dissolved oxygen in the mixture solution reached 0.2 ppm or below. The mixture solution was raised in temperature to reach 80° C. inside the vessel, followed by dropwise addition over 123 minutes of a monomer solution in which 160 g of NVP, 62 g of 2-hydroxyethyl acrylate (HEA), 0.36 g of triethanolamine (TEA) and 97 g of ultrapure water were mixed and an initiator solution in which 3.6 g of dimethyl-2,2'-azobis(isobutyrate) (V601 manufactured by Wako Pure Chemical Industries, Ltd.) was dissolved in 31 g of IPA.

Subsequently, a monomer solution in which 10 g of HEA, 5 g of ultrapure water and 14 g of IPA were mixed was added to the vessel over 60 minutes. Thereafter, the mixture solution was raised in temperature and distilled for 90 minutes, thereby obtaining a clear, colorless polymer solution.

Using the vinylpyrrolidone-based polymer obtained in the above manner, a negative electrode was produced according to the manner described in the above "Production of Negative Electrode" so that the solids composition of a final negative electrode slurry, by mass ratio, would be artificial graphite/CMC/vinylpyrrolidone-based polymer/SBR=98:0.8:0.2:1.0. The obtained negative electrode is referred to as Example 3.

Example 4

To produce the above vinylpyrrolidone-based polymer, 282 g of ultrapure water, 121 g of isopropyl alcohol (IPA) and 10 g of NVP were added as initial feeds to a SUS 304-made polymerization vessel provided with a condenser, a nitrogen introduction line and a thermometer, and nitrogen was introduced into the vessel while the mixture was stirred until the dissolved oxygen in the mixture solution reached 0.2 ppm or below. The mixture solution was raised in temperature to reach 80° C. inside the vessel, followed by dropwise addition over 123 minutes of a monomer solution in which 182 g of NVP, 41 g of 2-hydroxyethyl acrylate (HEA), 0.36 g of triethanolamine (TEA) and 97 g of ultrapure water were mixed and an initiator solution in which 3.6 g of dimethyl-2,2'-azobis(isobutyrate) (V601 manufactured by Wako Pure Chemical Industries, Ltd.) was dissolved in 31 g of IPA.

Subsequently, a monomer solution in which 7 g of HEA, 5 g of ultrapure water and 14 g of IPA were mixed was added to the vessel over 60 minutes. Thereafter, the mixture solution was raised in temperature and distilled for 90 minutes, thereby obtaining a clear, colorless polymer solution.

Using the vinylpyrrolidone-based polymer obtained in the above manner, a negative electrode was produced according to the manner described in the above "Production of Negative Electrode" so that the solids composition of a final negative electrode slurry, by mass ratio, would be artificial graphite/CMC/vinylpyrrolidone-based polymer/SBR=98:0.8:0.2:1.0. The obtained negative electrode is referred to as Example 4.

Example 5

To produce the above vinylpyrrolidone-based polymer, 282 g of ultrapure water, 121 g of isopropyl alcohol (IPA) and 10 g of NVP were added as initial feeds to a SUS 304-made polymerization vessel provided with a condenser, a nitrogen introduction line and a thermometer, and nitrogen was introduced into the vessel while the mixture was stirred until the dissolved oxygen in the mixture solution reached 0.2 ppm or below. The mixture solution was raised in temperature to reach 80° C. inside the vessel, followed by dropwise addition over 123 minutes of a monomer solution in which 182 g of NVP, 41 g of methyl 2-hydroxymethyl acrylate (MHMA), 0.36 g of triethanolamine (TEA) and 97 g of ultrapure water were mixed and an initiator solution in which 3.6 g of dimethyl-2,2'-azobis(isobutyrate) (V601 manufactured by Wako Pure Chemical Industries, Ltd.) was dissolved in 31 g of IPA.

Subsequently, a monomer solution in which 7 g of MHMA, 5 g of ultrapure water and 14 g of IPA were mixed was added to the vessel over 60 minutes. Thereafter, the mixture solution was raised in temperature and distilled for 90 minutes, thereby obtaining a clear, colorless polymer solution.

Using the vinylpyrrolidone-based polymer obtained in the above manner, a negative electrode was produced according to the manner described in the above "Production of Negative Electrode" so that the solids composition of a final negative electrode slurry, by mass ratio, would be artificial graphite/CMC/vinylpyrrolidone-based polymer/SBR=98:0.8:0.2:1.0. The obtained negative electrode is referred to as Example 5.

Example 6

To produce the above vinylpyrrolidone-based polymer, 49 g of ultrapure water was added as an initial feed to a SUS 304-made polymerization vessel provided with a condenser, a nitrogen introduction line and a thermometer, and nitrogen was introduced into the vessel while the mixture was stirred until the dissolved oxygen in the mixture solution reached 0.2 ppm or below. The mixture solution was raised in temperature to reach 90° C. inside the vessel, followed by dropwise addition over 180 minutes of a monomer solution (M5-1) in which 53 g of NVP, 0.53 g of TEA and 34 g of ultrapure water were mixed, a monomer solution in which 98 g of polyethylene glycol monoacrylate ("BLEMMER® AE-400" manufactured by NOF Corporation) and 65 g of ultrapure water were mixed and an initiator solution in which 2.3 g of dimethyl-2,2'-azobis(isobutyrate) (V601 manufactured by Wako Pure Chemical Industries, Ltd.) was dissolved in 93 g of IPA and 199 g of ultrapure water.

After further aging for 60 minutes, an initiator solution in which 0.5 g of dimethyl-2,2'-azobis(isobutyrate) was dissolved in 4.5 g of IPA was added to the vessel. Thereafter, the mixture solution was raised in temperature and distilled for 90 minutes, thereby obtaining a clear, colorless polymer solution.

Using the vinylpyrrolidone-based polymer obtained in the above manner, a negative electrode was produced according to the manner described in the above "Production of Negative Electrode" so that the solids composition of a final negative electrode slurry, by mass ratio, would be artificial graphite/CMC/vinylpyrrolidone-based polymer/SBR=98:0.8:0.2:1.0. The obtained negative electrode is referred to as Example 6.

Example 7

To produce the above vinylpyrrolidone-based polymer, 282 g of ultrapure water, 121 g of isopropyl alcohol (IPA) and 11 g of NVP were added as initial feeds to a SUS 304-made polymerization vessel provided with a condenser, a nitrogen introduction line and a thermometer, and nitrogen was introduced into the vessel while the mixture was stirred until the dissolved oxygen in the mixture solution reached 0.2 ppm or below. The mixture solution was raised in temperature to reach 80° C. inside the vessel, followed by dropwise addition over 123 minutes of a monomer solution in which 205 g of NVP, 21 g of 2-hydroxyethyl acrylate (HEA), 0.36 g of triethanolamine (TEA) and 97 g of ultrapure water were mixed and an initiator solution in which 3.6 g of dimethyl-2,2'-azobis(isobutyrate) (V601 manufactured by Wako Pure Chemical Industries, Ltd.) was dissolved in 31 g of IPA.

Subsequently, a monomer solution in which 3 g of HEA, 5 g of ultrapure water and 14 g of IPA were mixed was added to the vessel over 60 minutes. Thereafter, the mixture solution was raised in temperature and distilled for 90 minutes, thereby obtaining a clear, colorless polymer solution.

Using the vinylpyrrolidone-based polymer obtained in the above manner, a negative electrode was produced according to the manner described in the above "Production of Negative Electrode" so that the solids composition of a final negative electrode slurry, by mass ratio, would be artificial graphite/CMC/vinylpyrrolidone-based polymer/SBR=98:0.8:0.2:1.0. The obtained negative electrode is referred to as Example 7.

Comparative Example 1

A negative electrode was produced according to the manner described in the above "Production of Negative Electrode" except that the solids composition of a final negative electrode slurry had an artificial graphite to CMC to SBR mass ratio of 98:1:1. The obtained negative electrode is referred to as Comparative Example 1.

Comparative Example 2

To produce the above vinylpyrrolidone-based polymer, 93.8 kg of ion-exchanged water and 0.0046 g of copper(II) sulfate were added as initial feeds to a SUS 304-made polymerization vessel provided with a condenser, a nitrogen introduction line and a thermometer, nitrogen was then introduced into the vessel while the mixture was stirred until the dissolved oxygen in the mixture solution reached 0.2 ppm or below, and the mixture solution was then raised in temperature to 60° C. Next, while the mixture solution temperature was maintained at 60° C., 100 kg of N-vinylpyrrolidone (NVP), 0.6 kg of 25% aqueous ammonia and 3.4 kg of 35% hydrogen peroxide aqueous solution were individually dropwise added to the vessel over 180 minutes. After the dropwise addition, 0.2 kg of 25% aqueous ammonia was further added to the vessel. Four hours after the start of the reaction, the mixture solution temperature was raised to 80° C., and 0.5 kg of 35% hydrogen peroxide water was added to the vessel. Next, 5.5 hours after the start of the reaction, 0.5 kg of 35% hydrogen peroxide water was added to the vessel, and the mixture solution was maintained at 80° C. for an hour, thereby obtaining a polyvinylpyrrolidone polymer solution.

Using the vinylpyrrolidone-based polymer obtained in the above manner, a negative electrode was produced according to the manner described in the above "Production of Negative Electrode" so that the solids composition of a final negative electrode slurry, by mass ratio, would be artificial graphite/CMC/vinylpyrrolidone-based polymer/SBR=98:0.8:0.2:1.0. The obtained negative electrode is referred to as Comparative Example 2.

Comparative Example 3

To produce the above vinylpyrrolidone-based polymer, 282 g of ultrapure water, 121 g of isopropyl alcohol (IPA) and 8 g of NVP were added as initial feeds to a SUS 304-made polymerization vessel provided with a condenser, a nitrogen introduction line and a thermometer, and nitrogen was introduced into the vessel while the mixture was stirred until the dissolved oxygen in the mixture solution reached 0.2 ppm or below. The mixture solution was raised in temperature to reach 80° C. inside the vessel, followed by dropwise addition over 123 minutes of a monomer solution in which 160 g of NVP, 62 g of ethyl acrylate, 0.36 g of triethanolamine (TEA) and 97 g of ultrapure water were mixed and an initiator solution in which 3.6 g of dimethyl-2,2'-azobis(isobutyrate) (V601 manufactured by Wako Pure Chemical Industries, Ltd.) was dissolved in 31 g of IPA.

Subsequently, a monomer solution in which 10 g of ethyl acrylate, 5 g of ultrapure water and 14 g of IPA were mixed was added to the vessel over 60 minutes. Thereafter, the mixture solution was raised in temperature and distilled for 90 minutes, thereby obtaining a clear, colorless polymer solution.

Using the vinylpyrrolidone-based polymer obtained in the above manner, a negative electrode was produced according to the manner described in the above "Production of Negative Electrode" so that the solids composition of a final negative electrode slurry, by mass ratio, would be artificial graphite/CMC/vinylpyrrolidone-based polymer/SBR=98:0.8:0.2:1.0. The obtained negative electrode is referred to as Comparative Example 3.

Comparative Example 4

To produce the above vinylpyrrolidone-based polymer, 46 g of ultrapure water was added as an initial feed to a SUS 304-made polymerization vessel provided with a condenser, a nitrogen introduction line and a thermometer, and nitrogen was introduced into the vessel while the mixture was stirred until the dissolved oxygen in the mixture solution reached 0.2 ppm or below. The mixture solution was raised in temperature to reach 90° C. inside the vessel, followed by dropwise addition over 180 minutes of a monomer solution in which 120 g of NVP, 0.53 g of TEA and 13 g of ultrapure water were mixed, a monomer solution (M5-2) in which 30 g of polyethylene glycol monoacrylate ("BLEMMER® AE-400" manufactured by NOF Corporation) and 90 g of ultrapure water were mixed and an initiator solution in which 2.3 g of dimethyl-2,2'-azobis(isobutyrate) (V601 manufactured by Wako Pure Chemical Industries, Ltd.) was dissolved in 91 g of IPA and 199 g of ultrapure water.

After further aging for 60 minutes, an initiator solution in which 0.5 g of dimethyl-2,2'-azobis(isobutyrate) was dissolved in 4.5 g of IPA was added to the vessel. Thereafter, the mixture solution was raised in temperature and distilled for 90 minutes, thereby obtaining a clear, colorless polymer solution.

Using the vinylpyrrolidone-based polymer obtained in the above manner, a negative electrode was produced according to the manner described in the above "Production of Negative Electrode" so that the solids composition of a final negative electrode slurry, by mass ratio, would be artificial graphite/CMC/vinylpyrrolidone-based polymer/SBR=98:0.8:0.2:1.0. The obtained negative electrode is referred to as Comparative Example 4.

In producing a slurry for forming a negative-electrode active material layer, the timings of addition of CMC and hydroxyl group-containing PVP are not particularly limited. For example, CMC and hydroxyl group-containing PVP may be simultaneously added. Alternatively, one of these substances may be first added and mixed with a negative-electrode active material and the other may be then added. However, hydroxyl group-containing PVP has a higher adsorbability on the negative-electrode active material than CMC. Therefore, from the standpoint of increase in stability of dispersion of the negative-electrode active material in the active material layer, CMC is preferably added simultaneously with or before the addition of hydroxyl group-containing PVP, and more preferably added before the addition of hydroxyl group-containing PVP.

[Production of Positive Electrode]

Lithium cobaltate, acetylene black serving as a conductive carbon material and poly(vinylidene fluoride) (PVDF) were mixed in a mass ratio of 95:2.5:2.5 into NMP serving as a solvent using a mixer, thereby preparing a slurry for forming a positive-electrode active material layer.

The prepared slurry was coated on both sides of each of pieces of aluminum foil, then dried and rolled, thereby obtaining a positive electrode. The packing density of each positive electrode was 3.60 g/cm$^3$.

[Assembly of Battery]

Lead terminals were attached to each pair of the produced positive and negative electrodes, a separator was interposed between the pair of positive and negative electrodes, and these components were helically wound up together and pressed down in a flattened form, thereby producing an electrode assembly. Each electrode assembly thus produced was inserted into an aluminum laminate serving as a battery outer package, and a nonaqueous electrolytic solution as described above was then poured into the aluminum laminate, thereby producing a test battery. The design capacity of each battery was 800 mAh.

Each battery was designed to have an end-of-charge voltage of 4.2 V and designed so that the capacity ratio between positive and negative electrodes (ratio of first charge capacity of negative electrode to first charge capacity of positive electrode) at 4.2 V was 1.10.

[Calculation of Hydroxyl Group Equivalent and Pyrrolidone Equivalent of Vinylpyrrolidone-Based Polymer]

The hydroxyl group equivalent and pyrrolidone equivalent of the vinylpyrrolidone-based polymer in each of the above Examples and Comparative Examples were calculated according to the previously described equations.

[Measurement of Solid Content of Vinylpyrrolidone-Based Polymer]

Approximately 1 g of each polymer solution was weighed accurately in an aluminum cup and dried at 150° C. for an hour by a hot-air drier. The polymer was cooled in a desiccator for 10 minutes and then measured in terms of mass, the change in mass of the polymer before and after the drying was determined, and the solid content concentration of the polymer was calculated according to the following equation:

$$\text{Solid content (\%)} = \{(\text{mass of polymer after drying})/(\text{mass of polymer solution before drying})\} \times 100$$

[Measurement of pH of Vinylpyrrolidone-Based Polymer]

Using ultrapure water, a 10% by mass solution of each obtained polymer solution was prepared. The pH of the prepared solution was measured with a pH meter D-51 manufactured by HORIBA, Ltd.

[Measurement of K Value of Vinylpyrrolidone-Based Polymer]

Using ion-exchanged water, a 1% by mass solution of each of the polymer solutions obtained in Examples and Comparative Examples was prepared. The viscosity of the prepared solution was measured at 25° C. with a capillary viscometer. Using the obtained viscosity value, the K value of the solution was calculated according to the following method of Fikentscher:

$$(\log \eta rel)/C = [(75Ko^2)/(1+1.5KoC)] + Ko$$

where C represents the number of grams of polymer in 100 mL of solution, ηrel represents the measured viscosity of the polymer solution (relative viscosity; viscosity of 1% by mass solution of polymer compared to ion-exchanged water), and Ko represents a variable relating to K value (K=1000Ko).

[Measurement of Weight-Average Molecular Weight of Vinylpyrrolidone-Based Polymer]

The weight-average molecular weight, in terms of polyethylene glycol, of each vinylpyrrolidone-based polymer was determined by performing gel permeation chromatography (GPC) analysis with a fast GPC system "HLC-8320GPC EcoSEC®" manufactured by Tosoh Corporation under the following conditions:

Columns: "Shodex® SB-G", "Shodex® SB-806", "Shodex® SB-804", "Shodex® SB-803" and "Shodex® SB-802.5" all manufactured by Showa Denko K.K.;

Eluent: acetonitrile/aqueous solution of 0.1M sodium nitrate;
Flow rate of eluent: 0.8 mL/min;
Injection volume: 100 μL;
Column oven temperature: 40° C.;
Detector: differential refractive index detector (RI); and
Sample concentration: 0.5%

TABLE 1 shows the solid contents, pH values, K values and weight-average molecular weights (Mw) of vinylpyrrolidone-based polymers in the above Examples and Comparative Examples.

TABLE 1

|  | Solid Content (%) | pH | K Value | Mw |
|---|---|---|---|---|
| Ex. 1 | 43 | 5.3 | 35 | 37600 |
| Ex. 2 | 36 | 5.6 | 26 | 13300 |
| Ex. 3 | 49 | 4.3 | 30 | 20500 |
| Ex. 4 | 46 | 5.6 | 29 | 17000 |
| Ex. 5 | 44 | 5.5 | 32 | 19200 |
| Ex. 6 | 35 | 7.7 | 25 | 21300 |
| Ex. 7 | 41 | 7.4 | 36 | 27700 |
| Comp. Ex. 4 | 37 | 8.4 | 35 | 35100 |
| Comp. Ex. 2 | 50 | 4.6 | 28 | 18600 |
| Comp. Ex. 3 | 42 | 7.8 | 27 | 15600 |

TABLE 2 shows the Hf, Hw and Hn values, hydroxyl group equivalents, Pf, Pw and Pn values and pyrrolidone equivalents in the above Examples and Comparative Examples.

TABLE 2

|  | Hf | Hw | Hn | Hydroxyl Group Equivalent | Pf | Pw | Pn | Pyrrolidone Equivalent |
|---|---|---|---|---|---|---|---|---|
| Ex. 1 | 160 | 30 | 2 | 267 | 111 | 70 | 1 | 159 |
| Ex. 2 | 116 | 35 | 1 | 332 | 111 | 65 | 1 | 171 |
| Ex. 3 | 116 | 30 | 1 | 387 | 111 | 70 | 1 | 159 |
| Ex. 4 | 116 | 20 | 1 | 581 | 111 | 80 | 1 | 139 |
| Ex. 5 | 116 | 20 | 1 | 581 | 111 | 80 | 1 | 139 |
| Ex. 6 | 513 | 65 | 1 | 789 | 111 | 35 | 1 | 318 |
| Ex. 7 | 116 | 10 | 1 | 1161 | 111 | 90 | 1 | 123 |
| Comp. Ex. 4 | 513 | 20 | 1 | 2563 | 111 | 80 | 1 | 139 |
| Comp. Ex. 2 | — | — | — | — | 111 | 100 | 1 | 111 |
| Comp. Ex. 3 | — | — | — | — | 111 | 70 | 1 | 159 |

The pH of vinylpyrrolidone-based polymer is preferably within the range of 3 to 11, more preferably 4 to 9, and still more preferably 5 to 8. The K value is preferably within the range of 10 to 100, more preferably 15 to 90, still more preferably 20 to 70, and most preferably 25 to 50. The weight-average molecular weight is preferably within the range of 3000 to 1000000, more preferably 5000 to 100000, and still more preferably 10000 to 50000.

[Evaluation of Adhesion]

The electrodes obtained in the above Examples and Comparative Examples were evaluated in terms of adhesion. Specifically, the adhesion strength between the current collector and the active material layer of each electrode was evaluated by a 90 degree peel test method in the following manner.

More specifically, each negative electrode was attached onto a 120 mm×30 mm acrylic plate through a 70 mm×20 mm adhesive double-faced tape ("NAISTAK® NW-20" manufactured by Nichiban Co., Ltd.). An end of the negative electrode attached to the acrylic plate was pulled 55 mm upward from and at a right angle with the surface of the negative-electrode active material layer at a constant rate (50 mm/min) by a small desktop testing machine ("FGS-TV" and "FGP-5" manufactured by Nidec-Shimpo Corporation), thereby measuring the peeling strength upon peel-off. The measurement of the peeling strength was conducted three times, and the average value of the three measurement results was determined as a 90 degree peeling strength.

In TABLE 3, the relative values of the determined 90 degree peeling strengths with respect to that of Comparative Example 1 assigned 100 are indicated as "Adhesion".

[Evaluation of Electrode Hardness]

The electrode hardnesses of the electrodes of the above Examples and Comparative Examples were evaluated as indices for the flexibilities of the electrodes in the following manner.

Figure 2:
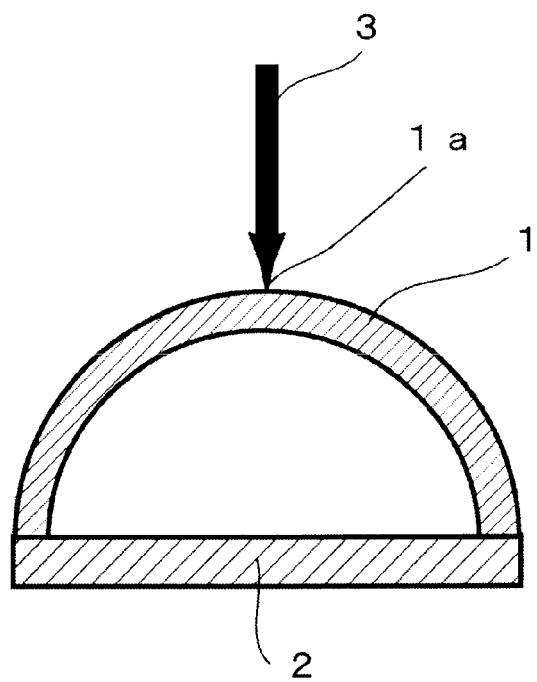
FIG. 2 is a schematic cross-sectional view showing a state of an electrode piece in which both ends thereof are attached to both ends of an acrylic plate.

Specifically, each electrode was cut out into a piece 50 mm wide and 20 mm long. As shown in FIG. 2, both ends of the cut electrode piece 1 were attached to both ends of a 30 mm wide acrylic plate 2 with double-faced tape. Next, using a pressure tester ("FGS-TV" and "FGP-0.5" manufactured by Nidec-Shimpo Corporation), a pressing force was applied to a central region 1a of the electrode piece 1 through a pressing part 3 of the tester. The pressing speed was a constant rate of 20 mm per minute.

Figure 3:
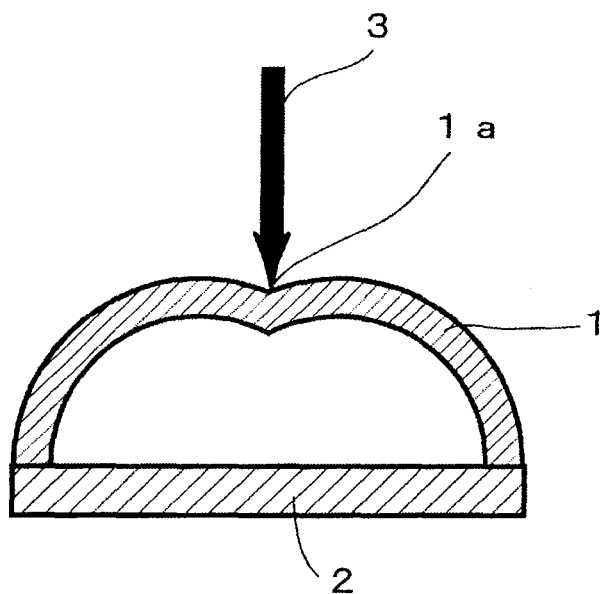
FIG. 3 is a schematic cross-sectional view showing a state of an electrode piece in which a central region thereof is pressed and has caused a downward bend.

FIG. 3 is a schematic cross-sectional view showing a state of the electrode piece 1 in which a downward bend has been produced in the central region 1a of the piece 1 by the application of the pressing force. A load applied to the piece 1 just before the above downward bend was produced was defined as the maximum load value.

FIG. 1 is a graph showing the relation between load applied to the negative electrode piece and displacement of the piece. As shown in FIG. 1, the maximum load value was determined as a maximum load. In TABLE 3, the relative values of the determined maximum loads with respect to that of Comparative Example 1 assigned 100 are indicated as "Electrode Hardness".

[Bend Test]

The flake-off resistance of the active material layer of each electrode when wound around a shaft with a predetermined diameter was evaluated according to the criteria listed below.

Figure 4:
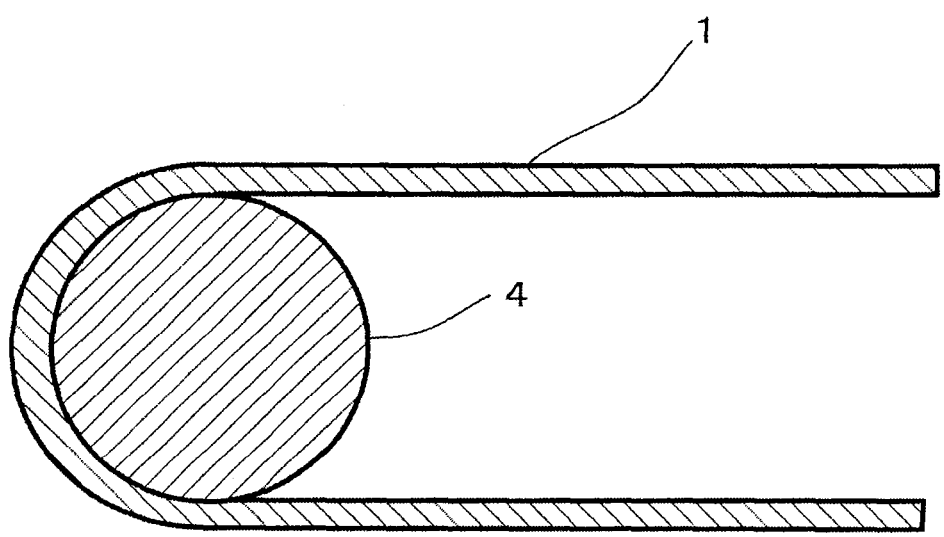
FIG. 4 is a schematic cross-sectional view for illustrating a bend test implemented in Examples.

FIG. 4 is a schematic cross-sectional view showing a state of an electrode 1 wound around a shaft 4 with a predetermined diameter. The electrode 1 was wound around the shaft 4 so that on the side of the electrode 1 not in contact with the shaft 4 the opposed portions of the electrode 1 were substantially parallel to each other.

○ (circle): The active material layer does not flake off when wound around a 2 mm-diameter shaft and also when wound around a 3 mm-diameter shaft.

Δ (triangle): The active material layer flakes off when wound around a 2 mm-diameter shaft but does not flake off when wound around a 3 mm-diameter shaft.

x (cross): The active material layer flakes off when wound around a 2 mm-diameter shaft and also when wound around a 3 mm-diameter shaft.

The evaluation results are shown in TABLE 3.

TABLE 3

|  | Hydroxyl Group Equivalent | Pyrrolidone Equivalent | Adhesion (%) | Electrode Hardness (%) | Bend Test |
|---|---|---|---|---|---|
| Comp. Ex. 1 | — | — | 100 | 100 | X |
| Ex. 1 | 267 | 159 | 286 | 104 | ○ |

TABLE 3-continued

|  | Hydroxyl Group Equivalent | Pyrrolidone Equivalent | Adhesion (%) | Electrode Hardness (%) | Bend Test |
| --- | --- | --- | --- | --- | --- |
| Ex. 2 | 332 | 171 | 186 | 117 | Δ |
| Ex. 3 | 387 | 159 | 236 | 109 | ○ |
| Ex. 4 | 581 | 139 | 273 | 120 | ○ |
| Ex. 5 | 581 | 139 | 218 | 109 | ○ |
| Ex. 6 | 789 | 318 | 149 | 104 | Δ |
| Ex. 7 | 1161 | 123 | 256 | 137 | Δ |
| Comp. Ex. 4 | 2563 | 139 | 217 | 151 | X |
| Comp. Ex. 2 | — | 111 | 267 | 141 | X |
| Comp. Ex. 3 | — | 159 | 273 | 146 | X |

As shown in TABLE 3, comparison of Comparative Example 1 with Examples and the other Comparative Examples reveals that the addition of a vinylpyrrolidone-based polymer as a binder resin to the active material layer improves the adhesion.

Furthermore, comparison of Comparative Examples 2 and 3 with Examples 1 to 7 shows that the incorporation of hydroxyl groups into the vinylpyrrolidone-based polymer lowers the electrode hardness and thereby offers the electrode good flexibility. Comparing Comparative Example 1 with Examples 1 to 7, Comparative Example 1 has a lower electrode hardness. However, the results of the bend test reveal that the electrodes of Examples 1 to 7 have higher flexibility than that of Comparative Example 1.

Moreover, comparison of Examples 1 to 7 with Comparative Example 4 shows that the hydroxyl group equivalent of vinylpyrrolidone-based polymer is preferably within the range of 250 to 2500. In Comparative Example 4 in which the hydroxyl group equivalent is over 2500, the electrode hardness is high so that the electrode flexibility has been lost, and the active material layer was found to flake off even when wound around a 2 mm-diameter shaft in the bend test.

If the hydroxyl group equivalent of vinylpyrrolidone-based polymer is small, i.e., if the amount of hydroxyl groups per molecule is large, the amount of pyrrolidone groups per hydroxyl group is small. This decreases the effects derived from pyrrolidone groups, whereby the adhesion tends to be lowered. On the other hand, if the hydroxyl group equivalent of the polymer is large, i.e., if the amount of hydroxyl groups per molecule is small, the adsorbability of pyrrolidone groups on the active material is less likely to be reduced by the hydroxyl groups, whereby the electrode tends to become hardened.

The hydroxyl group equivalent of vinylpyrrolidone-based polymer is more preferably within the range of 250 to 800, and still more preferably 250 to 600.

Comparison between Examples 2 and 3 reveals that if the pyrrolidone equivalent of vinylpyrrolidone-based polymer is increased, i.e., if the amount of pyrrolidone groups per molecule is decreased, the adhesion is lowered, so that in the bend test the active material layer becomes more likely to flake off. Therefore, the pyrrolidone equivalent of vinylpyrrolidone-based polymer is preferably not more than 170. In addition, the pyrrolidone equivalent is preferably not less than 112, more preferably not less than 120, and still more preferably not less than 130.

The above Examples are examples in which negative electrodes are produced using compositions for electrodes in which the present invention has been embodied. However, the present invention is not limited to these examples. For example, the compositions for electrodes in which the present invention has been embodied may be used to produce positive electrodes. Alternatively, the compositions for electrodes in which the present invention has been embodied may be used to produce both of positive and negative electrodes.

What is claimed is:

1. A composition for an electrode of a nonaqueous electrolyte secondary battery, the composition comprising an active material and a binder resin, wherein
    the binder resin comprises a vinylpyrrolidone-based polymer, and the hydroxyl group equivalent of the vinylpyrrolidone-based polymer is within the range of 250 to 2500;
    wherein hydroxyl group equivalent means the molecular weight per hydroxyl group in the polymer calculated according to the following equation:

$$\{Hf \times (100/Hw)\}/Hn$$

wherein Hf represents the molecular weight of monomer-giving hydroxyl groups in the polymer, Hn represents the number of hydroxyl groups contained in the monomer, and Hw represents the initial weight percentage (%) of the monomer serving as a source of hydroxyl groups in the polymer;
and wherein
"vinylpyrrolidone-based polymer" means a hydroxyl group-containing polyvinylpyrrolidone.

2. The composition for an electrode of a nonaqueous electrolyte secondary battery according to claim 1, wherein the pyrrolidone equivalent of the vinylpyrrolidone-based polymer is within the range of 112 to 170;
    wherein "pyrrolidone equivalent" means the molecular weight per pyrrolidone ring in the polymer calculated according to the following equation:

$$\{Pf \times (100/Pw)\}/Pn$$

where Pf represents the molecular weight of monomer serving as a source of pyrrolidone in the polymer, Pn represents the number of pyrrolidone rings contained in the monomer, and Pw represents the initial mass percentage (%) of the monomer serving as a source of pyrrolidone in the polymer.

3. The composition for an electrode of a nonaqueous electrolyte secondary battery according to claim 1, wherein the binder resin further comprises carboxymethyl cellulose and a latex binder.

4. The composition for an electrode of a nonaqueous electrolyte secondary battery according to claim 2, wherein the binder resin further comprises carboxymethyl cellulose and a latex binder.

5. An electrode for a nonaqueous electrolyte secondary battery, wherein an active material layer formed using the composition for an electrode according to claim 1 is provided on a current collector.

6. An electrode for a nonaqueous electrolyte secondary battery, wherein an active material layer formed using the composition for an electrode according to claim 2 is provided on a current collector.

7. An electrode for a nonaqueous electrolyte secondary battery, wherein an active material layer formed using the composition for an electrode according to claim 3 is provided on a current collector.

8. An electrode for a nonaqueous electrolyte secondary battery, wherein an active material layer formed using the composition for an electrode according to claim 4 is provided on a current collector.

9. A nonaqueous electrolyte secondary battery comprising the electrode according to claim 5 and a nonaqueous electrolyte.

10. A nonaqueous electrolyte secondary battery comprising the electrode according to claim 6 and a nonaqueous electrolyte.

11. A nonaqueous electrolyte secondary battery comprising the electrode according to claim 7 and a nonaqueous electrolyte.

12. A nonaqueous electrolyte secondary battery comprising the electrode according to claim 8 and a nonaqueous electrolyte.

13. The nonaqueous electrolyte secondary battery according to claim 9, wherein the electrode is used as a negative electrode.

14. The nonaqueous electrolyte secondary battery according to claim 10, wherein the electrode is used as a negative electrode.

15. The nonaqueous electrolyte secondary battery according to claim 11, wherein the electrode is used as a negative electrode.

16. The nonaqueous electrolyte secondary battery according to claim 12, wherein the electrode is used as a negative electrode.

* * * * *

UNITED STATES PATENT AND TRADEMARK OFFICE
CERTIFICATE OF CORRECTION

PATENT NO. : 8,603,674 B2
APPLICATION NO. : 12/977993
DATED : December 10, 2013
INVENTOR(S) : Tadayoshi Tanaka et al.

Page 1 of 1

It is certified that error appears in the above-identified patent and that said Letters Patent is hereby corrected as shown below:

On the Title page Item (73)

Change

(73) Assignee: SANYO Electric Co., Ltd.,
    Moriguchi-shi, Osaka (JP)

To be

(73) Assignee: SANYO Electric Co., Ltd.,
    Moriguchi-shi, Osaka (JP)

NIPPON SHOKUBAI CO., Ltd.,
    Osaka-shi, (JP)

Signed and Sealed this
Fifteenth Day of July, 2014

Michelle K. Lee
*Deputy Director of the United States Patent and Trademark Office*